J. F. WEBB, Jr.
AIR OPERATED ELECTRICALLY CONTROLLED VALVE MECHANISM FOR AIR BRAKE AND TRAIN STOPPING SYSTEMS.
APPLICATION FILED APR. 7, 1909.
948,404.
Patented Feb. 8, 1910.
6 SHEETS—SHEET 1.
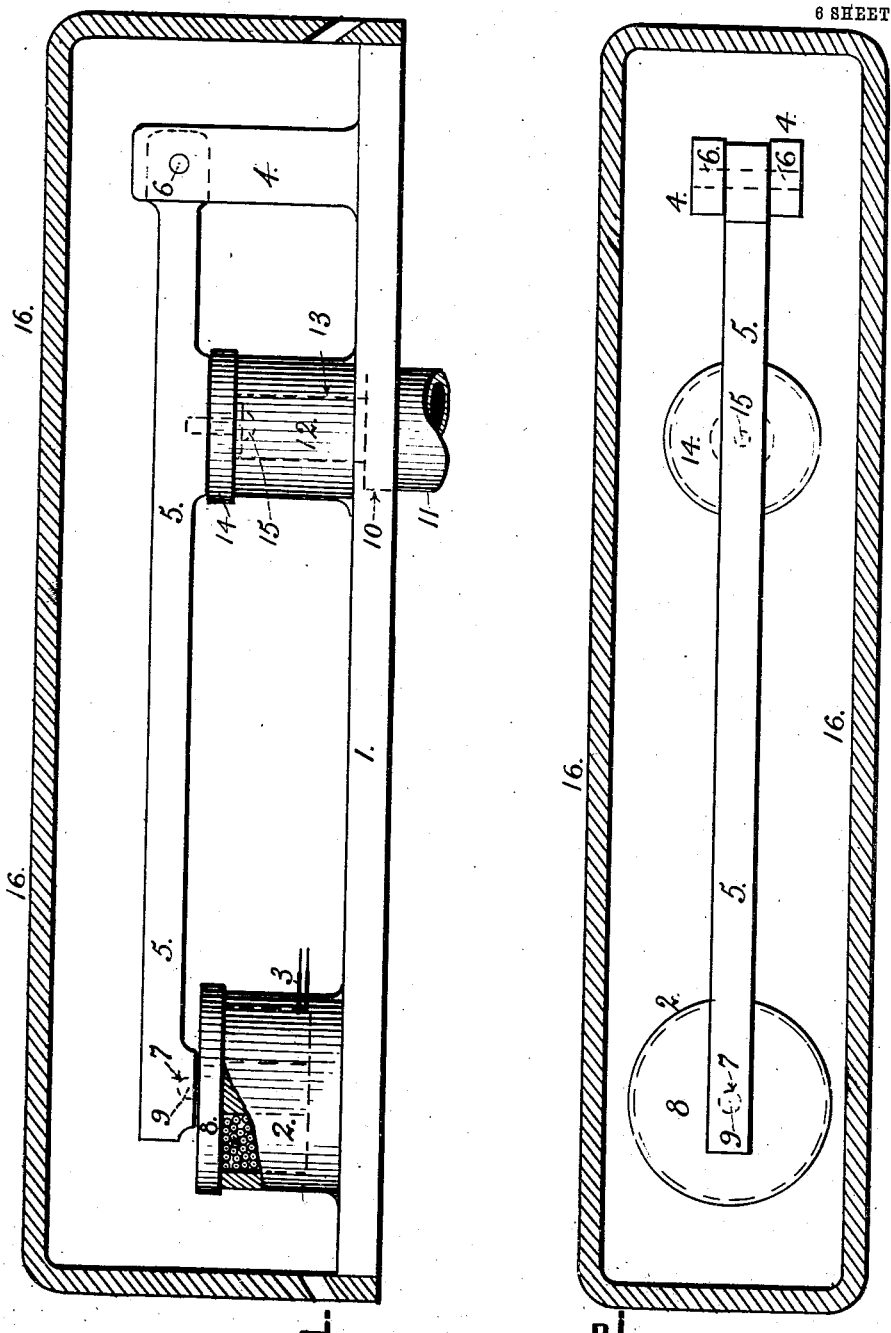
WITNESSES:
H. Woodard
Charles H. Wagner
INVENTOR
Jean F. Webb, Jr.
BY
Fred G. Dieterich & Co
ATTORNEYS.

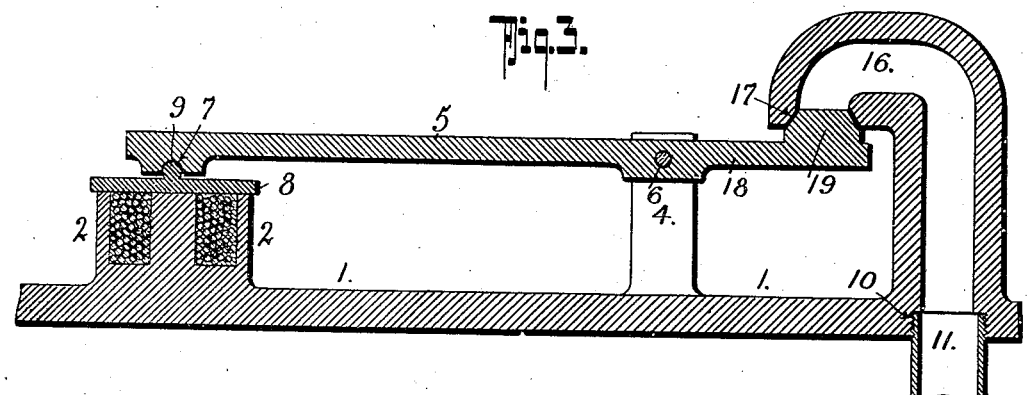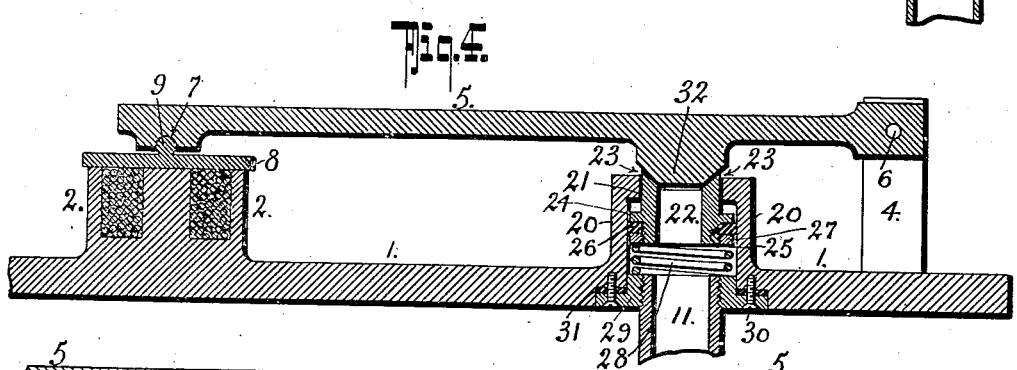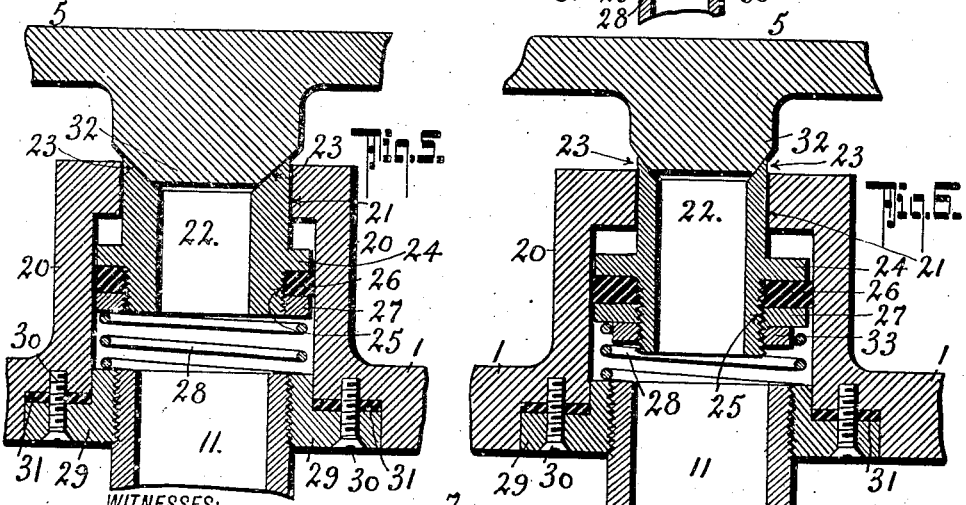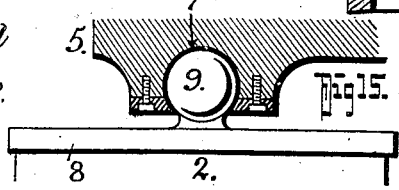

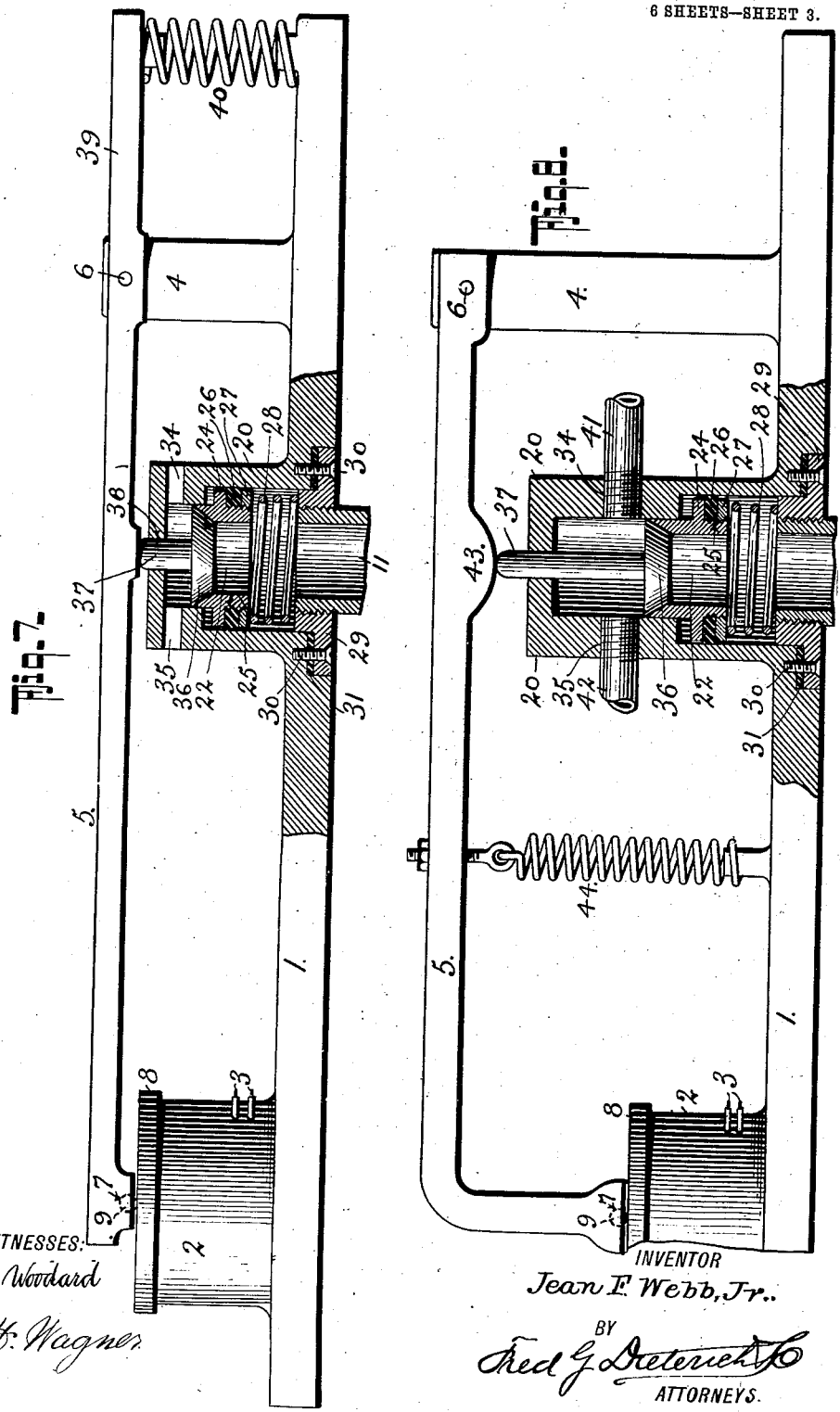

J. F. WEBB, Jr.
AIR OPERATED ELECTRICALLY CONTROLLED VALVE MECHANISM FOR AIR BRAKE AND TRAIN STOPPING SYSTEMS.
APPLICATION FILED APR. 7, 1909.
948,404.
Patented Feb. 8, 1910.
6 SHEETS—SHEET 4.
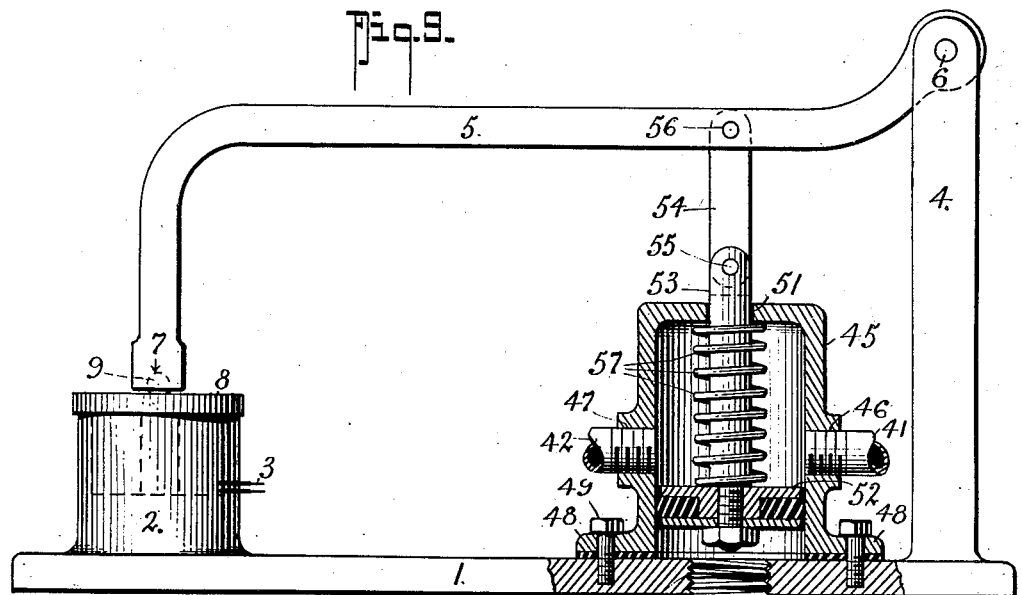
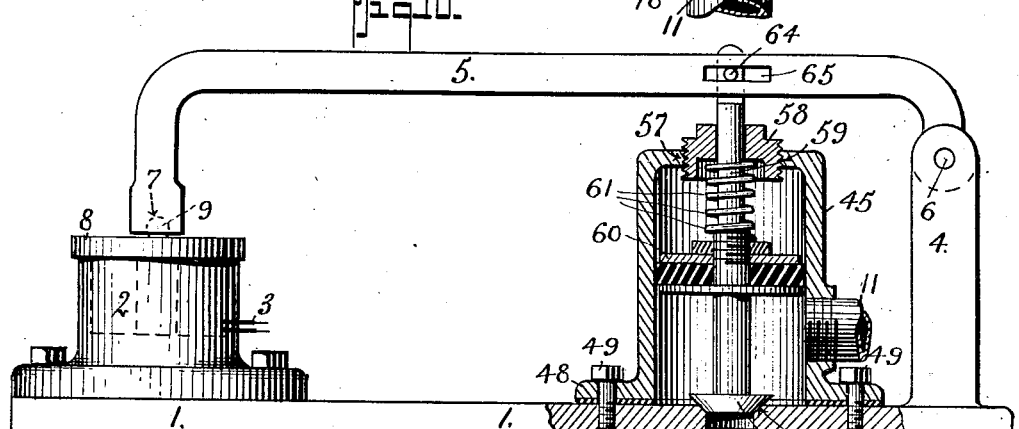
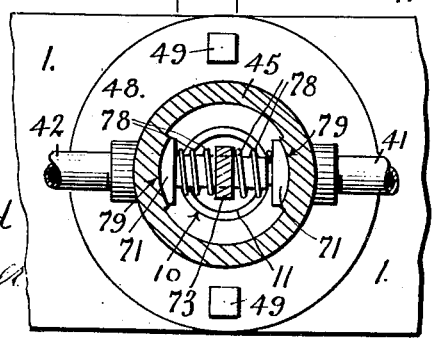
WITNESSES:
Hayward Woodard
Charles H. Wagner
INVENTOR
Jean F. Webb, Jr.
BY
Fred G. Dieterich
ATTORNEYS.

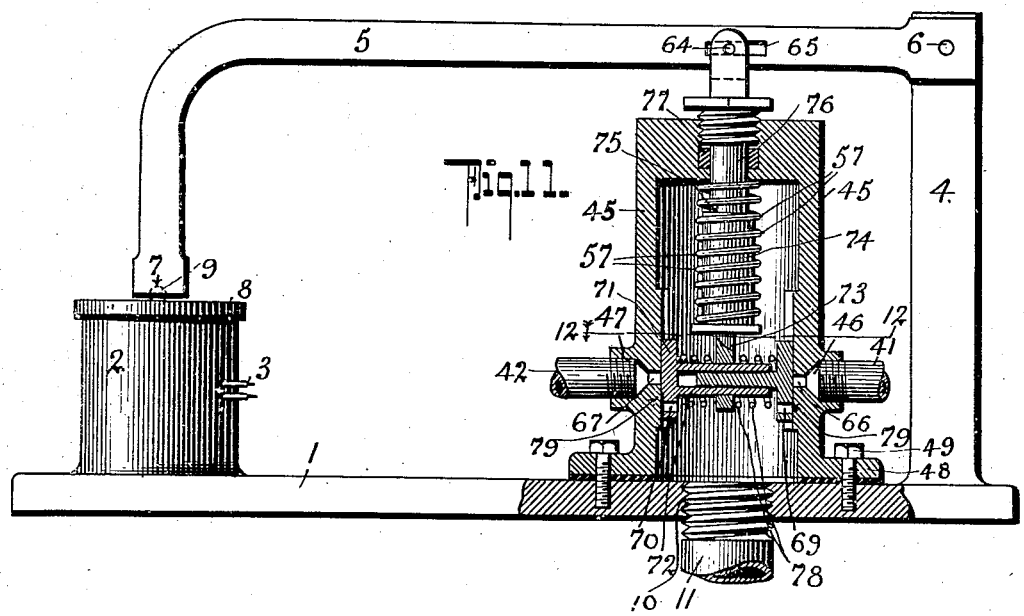
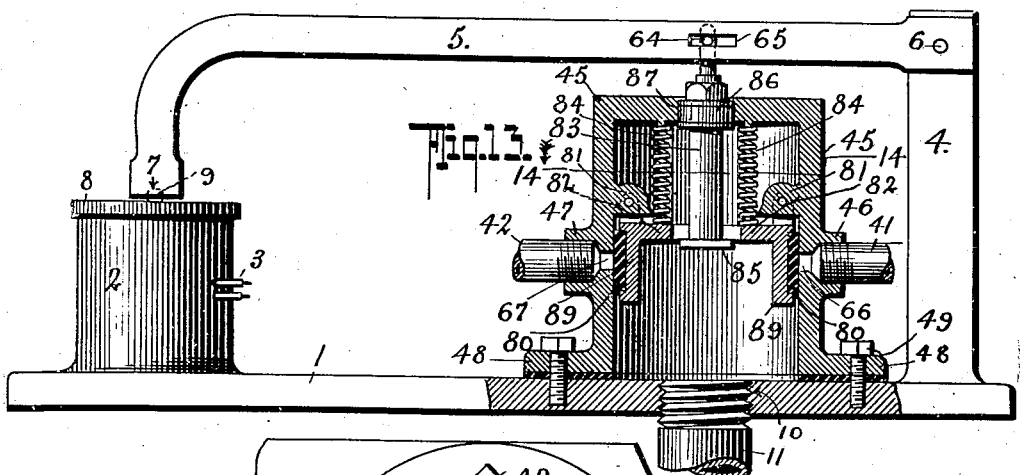
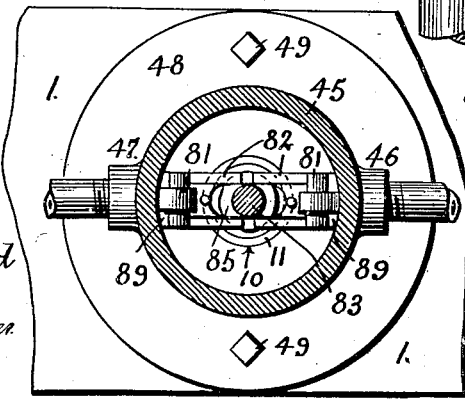

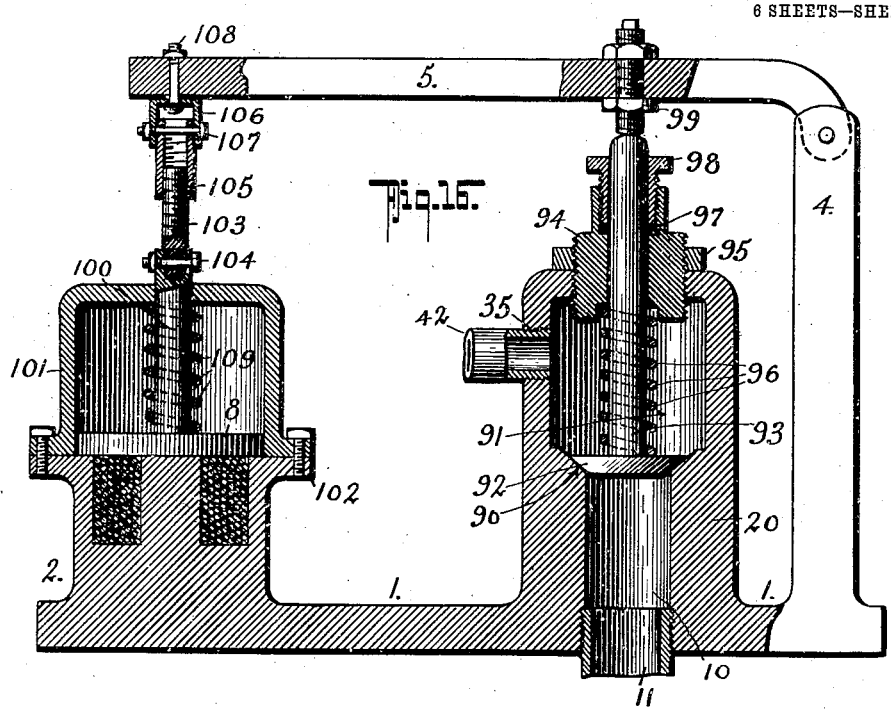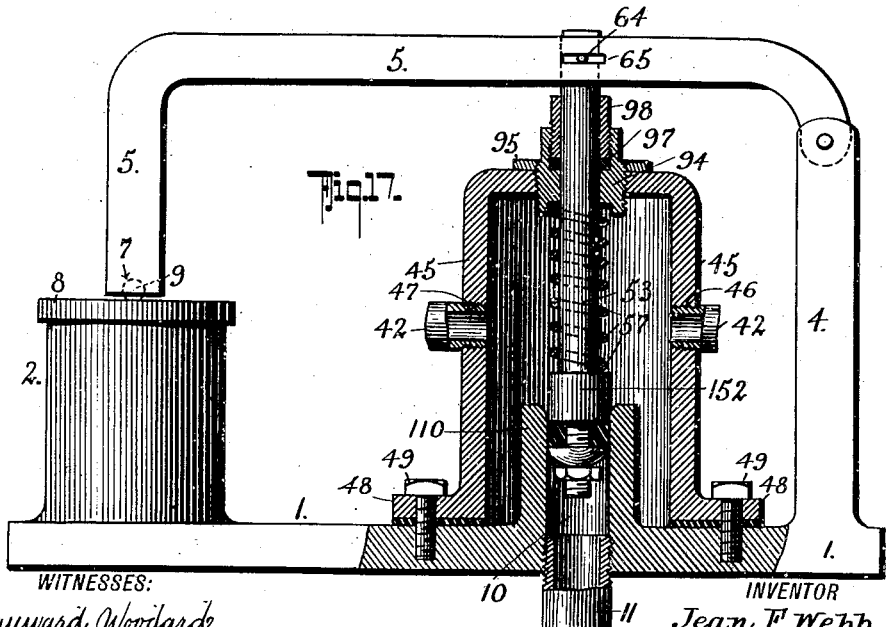

UNITED STATES PATENT OFFICE.

JEAN F. WEBB, JR., OF NEW YORK, N. Y., ASSIGNOR TO THE ELECTRIC SIGNAGRAPH AND SEMAPHORE CO., OF NEW YORK, N. Y., INCORPORATED.

AIR-OPERATED ELECTRICALLY-CONTROLLED VALVE MECHANISM FOR AIR-BRAKE AND TRAIN-STOPPING SYSTEMS.

948,404.      Specification of Letters Patent.      Patented Feb. 8, 1910.

Application filed April 7, 1909. Serial No. 488,390.

*To all whom it may concern:*

Be it known that I, JEAN F. WEBB, Jr., residing at New York, in the county of New York and State of New York, have invented certain new and useful Improvements in Air-Operated Electrically-Controlled Valve Mechanisms for Air-Brake and Train-Stopping Systems, of which the following is a specification.
My present invention embodies several different forms of air operated electrically controlled valve mechanisms for use in train stopping and controlling systems to set the air brakes of a train through the medium of the opening of an electric circuit.

Generically my present invention utilizes an electrically controlled lever mechanism for maintaining an exhausting air passage, from the air brake train pipe, normally closed, the use of the holding lever enabling a weaker controlling magnet to be used and hence economize in the expenditure of the electric energy necessary to energize such magnet, and at the same time render the operation of the mechanism more sensitive.

More specifically my invention as evidenced by this application discloses several different ways of accomplishing the same general result as that accomplished by the electrically controlled air operated valve mechanism which forms the subject-matter of my co-pending application filed March 1, 1909, Serial No. 480,551.

In its detail nature the present invention also includes those novel details of construction, combination and arrangement of parts, all of which will be first described and then be specifically pointed out in the appended claims, reference being had to the accompanying drawings, in which:

Figure 1, is a side elevation of one form of my invention, parts being broken away and the casing being shown in section. Fig. 2, is a top plan view thereof, the casing being shown in section. Fig. 3, is a vertical longitudinal section of the second form of my invention. Fig. 4, is a similar view of a third form of my invention. Fig. 5, is an enlarged vertical section of the valve mechanism proper disclosed in Fig. 4. Fig. 6, is a similar view of a slightly modified form of the valve construction shown in Fig. 5. Fig. 7, is a side elevation and part central vertical longitudinal section of a fourth form of my invention. Fig. 8, is a view similar to Fig. 7 of a fifth form of my invention. Fig. 9, is another view partly in central section and partly in elevation of a sixth form of my invention. Fig. 10, is a view similar to Fig. 9, of a seventh form of my invention. Fig. 11, is an elevation and part central vertical longitudinal section of an eighth form of my invention. Fig. 12, is a horizontal section on the line 12—12 of Fig. 11. Fig. 13, is another view partly in central vertical longitudinal section and partly in elevation of another form of the invention. Fig. 14, is a horizontal section on the line 14—14 of Fig. 13. Fig. 15, is an enlarged detail view of the ball and socket connection between the armature and the lever. Figs. 16 and 17, are views in longitudinal section and part elevation of further modifications.

In the drawings those parts which in purpose and function are common to all of the forms of my invention herein disclosed are designated by the same reference numerals.

Each form of my invention embodies a suitable support or base 1, an iron-clad electromagnet 2, having the wire terminals 3, to which the controlling circuit, (not shown) is connected. Each form also includes a support 4 to which, on a pivot 6, an armature carrying valve controlling lever 5 is secured, the lever 5 having a socket 7 to receive the ball 9 of the armature 8.

A housing 16, (shown only in Figs. 1 and 2) may inclose the operating parts of my invention.

The base 1 of the forms of my invention shown in Figs. 1, 2, 3, 9, 11 and 13, is bored as at 10 to receive the air pipe 11 that joins with the train pipe of an air brake system (not shown).

In the form of my invention shown in Fig. 1, the base 1 has a cylinder 12, having a port 13 in communication with the pipe 11 and held closed by the valve 14 that is secured to the lever 5 by a screw 15, or other equivalent means. The valve 14 prevents the compressed air in pipe 11 from escaping through the port 13, when the magnet 2 is energized and hence the equilibrium within the pipe 11 (and consequently that within the train pipe) is maintained. As soon, however, as the magnet 2 becomes deenergized, then air pressure in the pipe 11 and the port 13 will raise the valve 14 against the weight of the lever 5 and disturb the equilibrium within the train pipe to set the air brakes.

In the form shown in Fig. 3, I provide a goose-neck pipe 16, in communication with the pipe 11, and having a valved seat 17 to be engaged by a valve 19 of an extension 18 of the lever 5 beyond the pivot 6, so that when the magnet is energized the passage through the pipe 16 will be closed and the air prevented from escaping. When the magnet 2 becomes deënergized, however, the air pressure within the pipe 16 will force the valve 19 off its seat and permit the air to escape, thus disturbing the equilibrium within the pipe 11 and the train pipe and thereby setting the air brake.

In the figures shown in Figs. 4, 5 and 6, I provide a dome or housing 20 having an aperture 21 to permit passage of the projecting portion of a shiftable or movable valve seat member 22, the projecting end of which terminates in a valve seat 23 to engage the valve 32 on the lever 5. The shiftable valve seat member 22 has a flange 24 and a threaded part 25 to receive a packing ring 26 which is retained by a ring nut 27, as indicated in the drawings. The pipe 11 screws into a head 29 that is secured to the base 1 by screws 30, a packing ring 31 being interposed to prevent escape of air. A spring 28 normally tends to force the valve seat 23 into contact with the valve 32.

In the modifications of the shiftable valve members shown in Fig. 6, an additional jam nut 33 is provided for retaining the ring nut 27 in position.

In the form of my invention shown in Fig. 7, the dome or housing 20 has escape ports 34 and 35 and an aperture 38. The valve seat 22 does not project through the top of the dome 20 but coöperates with a valve 36 located within the dome or housing 20 below the ports 34 and 35. The valve 36 has its stem 37 projected through the aperture 38 in the housing 20, to engage the lever 5. The lever 5 has a projection 39 beyond the support 4, between which, and the base 1, the compression spring 40 is held to close the valve 36 and hold the armature 8 on the magnet 2.

The form shown in Fig. 8, is substantially the same as that shown in Fig. 7, differing therefrom only in the length of the valve stem 37, the height of the dome or housing 20 and the provision of pipes 41 and 42, tapped into the apertures 34 and 35 respectively, by means of which pipes, suitable signals (not shown) may be operated by the escaping air from the pipe 11 when the valve is open. In this form also, a curved heel 43 is provided on the lever 5 to engage the stem 37 and a coil spring 44 is secured to the lever 5 and the base 1 between the magnet 2 and the support 4 to perform the same functions as the spring 40 of the form shown in Fig. 7.

The form shown in Fig. 9, differs from the form shown in the foregoing figure in that I provide a valve casing, dome or housing 45 having a flange 48, by which it may be bolted to the base 1 by screw bolts 49, a packing being interposed to effect an air-tight joint. The valve housing 45 has ports 46 and 47, into which pipes 41 and 42 may be tapped, as in the form shown in Fig. 8. In this form, however, the valve 52 is in the nature of a packed piston valve whose stem 53 projects through an aperture 51 in the top wall of the housing 45 and connects with the lever 5 through a link 54 that is pivoted at 55 to the stem 53 and at 56 to the lever 5. Within the housing 45 a coil spring 57 surrounds the valve stem 53 to normally tend to move the piston valve downwardly to a position below the ports 46 and 47, when the armature 8 is in engagement with the magnet 2. Thus it will be seen that the piston valve 52 cuts off communication between the pipe 11 and the ports 46 and 47 when the parts are positioned as shown in Fig. 9. The parts are positioned as shown in Fig. 9, when the magnet 2 is energized, but as soon as the circuit is broken through the magnet 2, the air pressure from the pipe 11 will force the piston valve 52 upwardly beyond the ports 46 and 47 to permit the air to escape through such ports and hence disturb the equilibrium within the pipe 11 and the train pipe and thereby set the brakes.

The form shown in Fig. 10 differs from that shown in Fig. 9, and the other figures in that the pipe 11 that connects with the train pipe of an air brake system is tapped into the side of the dome 45 between a packed piston 60 and a valve 62, while the air escape or outlet pipe 41 is tapped into the base 1 into the port 10, which is provided with a valve seat 63 against which the valve 60 rests. The casing 45 has a threaded aperture 57 to receive a bearing plug 58 for the valve stem 59 which valve stem projects through said plug 58. Within the housing 45 the stem carries a packed piston 60, before referred to, that is always located above the inlet port for the pipe 11. A spring 61 is interposed to normally force the packed piston 60 downwardly, as in the form shown in Fig. 9, and in the form shown in Fig. 10 the valve stem 59 is projected below the packed piston 60 and terminates in a valve 62 that seats on a seat 63 formed in the base 1 to cut off communication between the housing 45 and the outlet pipe 41, when the magnet 2 is energized, and the valve 2 is held on its seat 63. The valve stem 59 projects through the bearing 58, as before stated, and is coupled with the lever 5 through the medium of a pin 64 that enters a slot 65 in the lever 5, so that the valve stem 59 may be moved in its axial line only, the slot 65 compensating for the arc movement of the lever 5. When the magnet 2 is energized the lever 5 holds the valve 62 seated, but when the magnet 2 becomes deënergized by breaking the electric circuit the air pressure within the housing 45 will exert greater force against the piston 60 than against the valve 62 and hence raising the valve 62 from its seat 63 and permit escape of air through the pipe 41 thus disturbing the equilibrium in the train pipe and pipe 11 and thereby setting the brakes. It is also to be noticed that the packed piston 60 prevents escape of air past the piston into the upper part of the housing 45 and hence it is unnecessary to form the bearing 58 with a gland.

In the forms shown in Figs. 11 and 12 the housing 45 has its ports 46—47 reduced as at 66—67 respectively to correspond with ports 69—70 of the slide valve 71, which valve has telescopic portions 72 that project through an aperture in the lower end 73 of the valve stem 74. The stem 74 has a portion 76 of reduced diameter to form a shoulder 75 that abuts the top of the housing 45 when the valve 71 is raised to aline the ports 66—69—67—70 respectively. The reduced portion 76 of the stem passes through a hole in the housing top and through a gland or packing box 77 to effect an air-tight joint. A coil spring 57 serves to assist in holding the valve 71 down to close the ports as in the forms shown in Figs. 9 and 10, while coil springs 78 serve to keep the valve heads 71 in alinement with the seats 79, as will be readily apparent by reference to Figs. 11 and 12 of the drawings. When the magnet 2 becomes deënergized to release the armature 8, the air pressure within the housing 45 will act on the rod 74 and thereby raise the valve 71 until the ports 66—67 are open, thereby disturbing the equilibrium within the pipe 11 and setting the brakes.

The forms shown in Figs. 13 and 14 differ from that shown in Fig. 11 and the preceding figures, in that the housing 45 has its ports 46—47 closed by flap valves 89. The ports 46—47 may be reduced as at 66—67 respectively in a manner similar to the form shown in Fig. 11. The valves 89 have rubber gaskets 80 to effect an air-tight closure of the ports 66—67. The valves 89 are pivoted to ears 81 within the housing and have forked arms 82 to straddle the stem 83. The valves 89 are normally held closed by springs 84 as well as the air pressure in the housing 45 when the magnet 2 is energized. The stem 83 has a head 85 to lift the valves 89 at times and it also has a packed piston 86 operating within an aperture 87 in the top of the housing 45 to effect an air-tight passage for the projecting end of the stem 83, which end is pivoted at 64 to the lever 5. The lever 5 has a slot 65 as in the form shown in Fig. 11. When the magnet 2 is deënergized, the air pressure with the housing 45 is sufficient to overcome the force of the spring 84 and the weight of the lever 5 and force the piston 86 upwardly sufficiently to cause the rod 83 to lift the valves 89 and permit escape of air into the pipes 41—42, thereby disturbing the equilibrium within the pipe 11 and setting the air brakes. The ears 81 also serve as stops for the valves 89 to prevent them opening beyond a predetermined distance so as to prevent the piston 86 from leaving the apertures in the top of the housing.

In Fig. 16, I have disclosed a further modification of my invention which differs from the other forms in that I provide the dome 20 with a valve seat 90 to receive the valve 92 whose stem 93 projects through a bushing 94 that is tapped into the head of the dome 20, but is held in place by a check nut 95, the bushing 94 being apertured to permit passage of the stem 93 of the valve 92 and packed at 97 by the provision of a gland nut 98 tapped into the bushing or plug 94. The valve stem 93 is surrounded by a spring 96 within the dome air space 91 to tend to seat the valve 92. The dome 20 in this form has but one aperture 35 for the outlet pipe 42. The lever 5 carries a valve stem engaging member 99, as shown, that abuts the upper end of the valve stem 93. The magnet 2 is provided with an armature casing 101 that is secured to the magnet 2, as at 102 and in this form the armature 8 is provided with a stem 100 that projects through the casing 101 and is pivoted at 104 to a rod 103 that is tapped into a socket piece 105 which in turn is pivoted at 107 to the V-shaped member 106 of a swivel joint, the V-shaped member 106 being pivoted to the lever 5, by the connection 108. Thus the armature 8 is connected with the lever 5 by an adjustable swivel connection. A spring 109 within the armature casing 101 assists the magnet 2 in holding the armature 8 down. By proper adjustments of the swivel link connection between the armature 8 and the lever 5 and the proper adjustment of the member 99, the valve 92 and the armature 8 may be made to seat themselves simultaneously.

In operation the magnet 2 when energized holds the armature 8 down. In this it is assisted by the spring 109 as well as the spring 96 that surrounds the valve stem 93. As soon, however, as the magnet 2 becomes deënergized the springs 109 and 96 not being of sufficient strength to overcome the pressure within the passage 10, the valve 92 becomes unseated and air escapes through the pipe 42, thus disturbing the equilibrium in the pipe 11 and consequently in the train pipe and setting the brakes.

The form shown in Fig. 17 somewhat resembles the form shown in Fig. 9, in its operation as well as in its structure. In this form, the armature 8 is swivelly connected by the ball and socket joint 9—7 to the lever 5 in the same manner as the form shown in Fig. 9. In the form shown in Fig. 17, also the housing 45 has ports 46—47 for the pipes 41—42 respectively. I also provide the form shown in Fig. 17 with a packed piston valve 152 that operates in the passage 10 of the base 1, the passage 10 being upwardly extended by the integrally formed wall 110. The stem 53 of the packed piston valve 152 passes through a plug 94 that is packed at 97 and has a gland nut 98 in a manner similar to the form shown in Fig. 16, a check nut 95 being provided, if desired. The stem 53 is pivoted at 64 to the lever 5, which in this form is provided with an elongated slot 65, as shown.

The operation of the form shown in Fig. 17 is similar to that of the form shown in Fig. 9, the operation only differing in that a smaller piston area is obtained by the form shown in Fig. 17, and hence less pressure is exerted against the piston valve 152 than that exerted against the piston valve 52 in the form shown in Fig. 9, and hence a weaker spring 57 may be provided in the form shown in Fig. 17 than in the form shown in Fig. 9, and also a weaker magnet 2 may be employed. Furthermore as the piston 152 in the form shown in Fig. 17 goes up entirely out of its cylinder 110, the distance it has to travel to permit the air to escape is very much less than in the form shown in Fig. 9. As the spring has to be fairly strong, the distance of travel of the piston is a matter of some importance practically as experiments have shown.

In this application I make no specific claim to the construction of valve mechanism *per se*, disclosed in Figs. 9, 11 and 17 of this application as the subject matter of such figures forms the subject matter of two other co-pending applications.

What I claim is:

1. An electromagnet, a valve mechanism including a valve adapted to open by pressure from within the valve mechanism, a lever coöperating therewith, an armature for the magnet carried by the lever to cause the lever to hold the valve shut when the magnet is energized, and means for assisting said magnet to normally hold said lever in its valve closing position.

2. An electromagnet, a valve mechanism including a valve adapted to open by pressure from within the valve mechanism, a lever coöperating therewith, an armature for the magnet carried by the lever to cause the lever to hold the valve shut when the magnet is energized, means for assisting said magnet in normally holding said lever in its valve closing position, and means for connecting said valve with an air brake system of a train to set the brakes when the magnet is deënergized, and the lever released to permit the valve to open.

3. In a train stopping system the combination with an air brake system of a train, a pipe connected with the train pipe, a valve mechanism connected with said pipe and including a movable valve normally closing the outlet of the valve to maintain the air pressure within the valve and pipe, said closing means comprising a lever operatively connected with the valve, an electromagnet, and an armature swivelly connected to the lever to coöperate with the electromagnet for retaining the lever in its valve closing position.

4. In a train stopping system the combination with an air brake system of a train, a pipe connected with the train pipe, a valve mechanism connected with said pipe and including a movable valve normally closing the outlet of the valve mechanism to maintain the air pressure within the valve and pipe, said closing means comprising a lever operatively connected with the valve, an electromagnet, an armature swivelly connected to the lever to coöperate with the electromagnet for retaining the lever in its valve closing position, and a housing for the valve mechanism and the electromagnet.

5. In a valve mechanism for train stopping systems comprising a base, a housing carried thereby, a pipe connection communicating with the housing and with the train pipe of an air brake system, said housing having an outlet, a shiftable valve within the housing to cut off communicataion between the outlet and the pipe that joins with the train pipe of the air brake system, a lever connected with said valve, an electromagnet on the base, an armature swivelly secured to the lever to coöperate with the electromagnet to hold the lever in a position to close the valve when the electromagnet is energized and cut off communication between the housing outlet and the pipe that connects with the train pipe.

6. In a valve controlling mechanism for train stopping systems, a base, a housing or dome thereon, said housing having an outlet and inlet pipe communicating with said housing and connectible to the train pipe of an air brake system, a shiftable valve seat within the housing, a valve for engaging said seat, a lever coöperatively connected with said valve, and electromagnetic devices coöperating with the lever for holding the lever in a position to close said valve when the electromagnetic devices are energized.

7. In a valve controlling mechanism for train stopping systems, a base, a housing or dome thereon, said housing having an outlet and inlet pipe communicating with said housing and connectible to the train-pipe of an air brake system, a shiftable valve seat within the housing, a valve for engaging said seat, a lever coöperatively connected with said valve, an electromagnetic device coöperating with the lever for holding the lever in a position to close said valve when the electromagnetic device is energized, and means normally tending to move the shiftable valve seat in one direction.

8. In a valve controlling mechanism for train stopping systems, a base, a housing or dome thereon, said housing having an outlet and inlet pipe communicating with said housing and connectible to the train pipe of an air brake system, a shiftable valve seat within the housing, a valve for engaging said seat, a lever coöperatively connected with said valve, electromagnetic devices coöperating with the lever for holding the lever in a position to close said valve when the electromagnetic devices are energized, said shiftable valve seat comprising a sleeve having a packed piston within the housing and having a valve seat portion to engage said valve.

9. In a valve controlling mechanism for train stopping systems, a base, a housing or dome thereon, said housing having an outlet and inlet pipe communicating with said housing and connectible to the train pipe of an air brake system, a shiftable valve seat within the housing, a valve for engaging said seat, a lever coöperatively connected with said valve, electromagnetic devices coöperating with the lever for holding the lever in a position to close said valve when the electromagnetic devices are energized, means normally tending to move the shiftable valve seat in one direction, said shiftable valve seat comprising a sleeve having a packed piston within the housing and having a valve seat portion to engage said valve.

10. A valve mechanism including a valve adapted to open by pressure from within the valve mechanism, a lever coöperating therewith, an electromagnet, an armature therefor, swivel link connections between said armature and said lever to hold said valve shut when the magnet is energized.

11. A valve mechanism including a valve adapted to open by pressure from within the valve mechanism, a lever coöperating therewith, an electromagnet, an armature therefor, swivel link connections between said armature and said lever to hold said valve shut when the magnet is energized, and a housing for said armature.

12. A valve mechanism including a valve adapted to open by pressure from within the valve mechanism, a lever coöperating therewith, an electromagnet, an armature therefor, swivel link connections between said armature and said lever to hold said valve shut when the magnet is energized, a housing for said armature, and means within said housing and engaging said armature for tending to cause said armature to engage said magnet.

13. A valve mechanism including a valve adapted to open by pressure from within the valve mechanism, a lever coöperating therewith, an electromagnet, an armature therefor, directly swivelly connected with said lever to hold said valve shut when the magnet is energized.

JEAN F. WEBB, Jr.

Witnesses:
H. L. ATKINSON,
G. SULLIVAN.